United States Patent [19]

Vannerson

[11] Patent Number: 5,239,318
[45] Date of Patent: Aug. 24, 1993

[54] FINGER DRIVER AND PRINTER

[75] Inventor: Eric Vannerson, Don Mills, Canada

[73] Assignee: Delphax Systems, Canton, Mass.

[21] Appl. No.: 792,454

[22] Filed: Nov. 15, 1991

[51] Int. Cl.$^5$ ............................................. G01D 15/06
[52] U.S. Cl. .................................... 346/159; 346/158; 358/300
[58] Field of Search ............... 346/159, 154, 158, 155; 358/298, 300

[56] References Cited

U.S. PATENT DOCUMENTS

| | | | |
|---|---|---|---|
| 4,160,257 | 7/1979 | Carrish | 346/159 |
| 4,365,549 | 12/1982 | Fotland et al. | 346/159 X |
| 4,841,313 | 6/1989 | Weiner | 346/159 |
| 4,990,942 | 2/1991 | Therrien et al. | 346/159 X |
| 4,992,807 | 2/1991 | Thomson | 346/155 |

Primary Examiner—R. L. Moses
Attorney, Agent, or Firm—Lahive & Cockfield

[57] ABSTRACT

A driver for the finger electrodes in a charge-deposition print cartridge controls the finger potential between a printing and a non-printing state. All fingers are reset at once by a common power source, to which each is connected by a diode. Charge storage provided in each finger electrode line keeps the finger at a back-biased potential without deterioration by crosstalk until it is next positively driven to a printing state. Binary-coded drive data is checked for errors at the input, and the charge delivered to each finger is monitored at the output to identify data transmission or cartridge electrode faults.

13 Claims, 5 Drawing Sheets

FINGER DRIVER AND PRINTER

BACKGROUND OF THE INVENTION

The present invention relates to drive circuitry for electronic imaging devices, for example, electrographic printers of the type wherein a print cartridge generates charge carriers and directs them at a recording or imaging member by the selective activation of electrodes of an electrode array. It is particularly directed to such printers wherein one set of electrodes is activated with a voltage to function as a generator of charge carriers, and a second set of electrodes are activated to extract or accelerate the charge carriers toward a latent imaging member.

Print cartridges of this type are described in U.S. Pat. No. 4,160,257, U.S. Pat. No. 4,628,227, and others. In the print cartridges described more particularly in the aforesaid patents, a set of electrodes are activated with an RF frequency signal of about several thousand volts amplitude to create a localized corona or glow discharge region. Lesser control voltages synchronized with the RF actuation are applied to one or more control electrodes located at or near the discharge region to gate positive or negative charge carriers from the region, and the print cartridge is biased with respect to an imaging member to maintain an accelerating field therebetween, thus depositing latent image charge dots on the imaging member as that member moves past the print cartridge.

In printing devices using this type of print cartridge, the RF driven corona generation lines extend along the width of the print cartridge, spanning many of the control electrodes, which cross them at an angle. One commercial embodiment, by way of example, has twenty parallel RF lines, which are crossed by one hundred twenty eight oblique control electrodes, known as finger electrodes. During the time when one RF line is activated, by a burst of approximately five to ten cycles of a several MHz drive signal with a peak to peak amplitude of approximately 2700 volts, those finger electrodes which cross the RF line at the desired dot locations are activated to deposit charge dots.

In conventional drive circuitry for such systems, the RF drive lines are actuated in a fixed sequence independently of the image being printed, while during any given RF line actuation, the number of finger electrodes which are actuated varies in accordance with the pattern being printed. After a slight delay for the RF voltage to ramp up, the designated finger electrodes are turned on to cause charge carriers to pass from the print cartridge and accelerate toward the drum, belt or other latent imaging member. Specifically, during their "OFF" cycle, each finger is back biased by several hundred volts with respect to the screen voltage; during their "ON" cycle, the finger voltage is switched to approximately the same potential as the screen.

In the original printers of this type, the individual finger electrodes were switched on for a fixed interval substantially co-extensive with the RF corona generation burst. Such operation produces a fixed amount of charge per actuation. More recently, in U.S. Pat. No. 4,841,313 of Nathan K. Weiner, constructions with a finger pulse of varying duration have been proposed. This operation varies the amount of charge deposited at each dot.

In print cartridges of the aforesaid type, the positive or negative half-cycles of individual RF waves applied to the RF electrodes generate charge carriers, and thus each one defines a basic quantum of charge which may be deposited as a latent image dot. In order to achieve a reasonable range of grey scale charge values using the control of U.S. Pat. No. 4,841,313 it is therefore necessary to provide a larger number of cycles in each burst of the RF line drive signal. This requires the use of a higher RF frequency, or a greater interval of time, for printing each dot, thus entailing trade-offs either in terms of circuit cost or of machine operating speed.

Another approach to producing grey-scale charge images is described in U.S. Pat. No. 4,992,807 of inventor Christopher W. Thomson. Printing apparatus as described in that patent operates by driving an RF electrode with a burst of RF energy, and developing a varying extraction potential synchronized with the RF burst. A finger electrode is then activated for one or more intervals, in phased relation to the variation of the potential, to gate the desired amount of charge from the print cartridge. The finger electrode may be activated with a pulse width modulated pulse and the extraction potential varied monotonically, or the finger electrode may be activated with one or more separate short pulses, each synchronized with a particular portion of the extraction potential curve. As further described in that patent, the finger actuating signal is shifted in width and offset in time so that charge carriers released by the RF excursions occurring during the RF actuation interval are subject to a several different extraction potentials. In any of these constructions, the varying extraction potential modulates the total amount of charge delivered by the print cartridge to form a latent image dot of controlled charge level.

In the aforesaid constructions, it is desirable to control the ON and OFF printing states with accuracy. When the control involves switching the bias potential of finger electrodes, the number and density of the electrodes make the implementation of suitable drive circuitry relatively complex and expensive.

In one presently available finger driver circuit, each finger is driven ON by a high voltage transistor, and when the transistor is not active, the finger potential is passively pulled up through a biasing resistor. That circuit has a relatively high component count, and suffers from a slow rise time not suitable for microsecond resolution of charge gating. Thus, it could not be applied to gate out an arbitrary or changing number of cycles of the RF actuation pulse-generated charge carriers.

In other embodiments of a finger drive circuit, component count can be reduced by replacing the discrete transistors by a small number of integrated circuits, such as the Supertex HV55 display driver chip, which contain shift registers, latches and output transistors with suitable voltage ratings. The positive terminal of the finger driver power supply may be directly connected to the back bias OFF potential, but even so, the pull-up function would have to be performed by an active device, e.g., a switching transistor, to achieve a fast rise time.

In view of the large number of finger electrodes, it is desirable to reduce component count or simplify the circuitry used in driving each finger, while still achieving a responsive and reliable voltage setting. It is further desirable to provide diagnostic functions.

SUMMARY OF THE INVENTION

A circuit for driving electrodes of a electrographic print cartridge controls the potential on each of plural finger electrodes to assume either an ON potential for printing, or an OFF potential in which no charge is deposited by the cartridge. All finger electrodes are connected by blocking diodes to a reset bus, which is reset to the OFF potential at a time when no finger is driven ON, and a charge storage element is connected to each finger to assure that thereafter it stays at the OFF potential until it is again driven ON. The amount of charge stored by each element prevents crosstalk between fingers from eroding the potential and allowing charge carriers to leak from the cartridges. A switching transistor is directly connected to the back-bias power supply, and actively drives the finger to its ON potential for printing a charge dot. Preferably an input stage performs a parity check of finger control data to remove input errors, and a charge monitor detects unusual current draw at the output stage to identify faulty finger electrodes.

BRIEF DESCRIPTION OF DRAWINGS

These and other features of the invention will be understood from the description of prior machines and illustrative embodiments of the invention, taken together with the drawings, wherein.

DETAILED DESCRIPTION OF INVENTION

Figure 1:
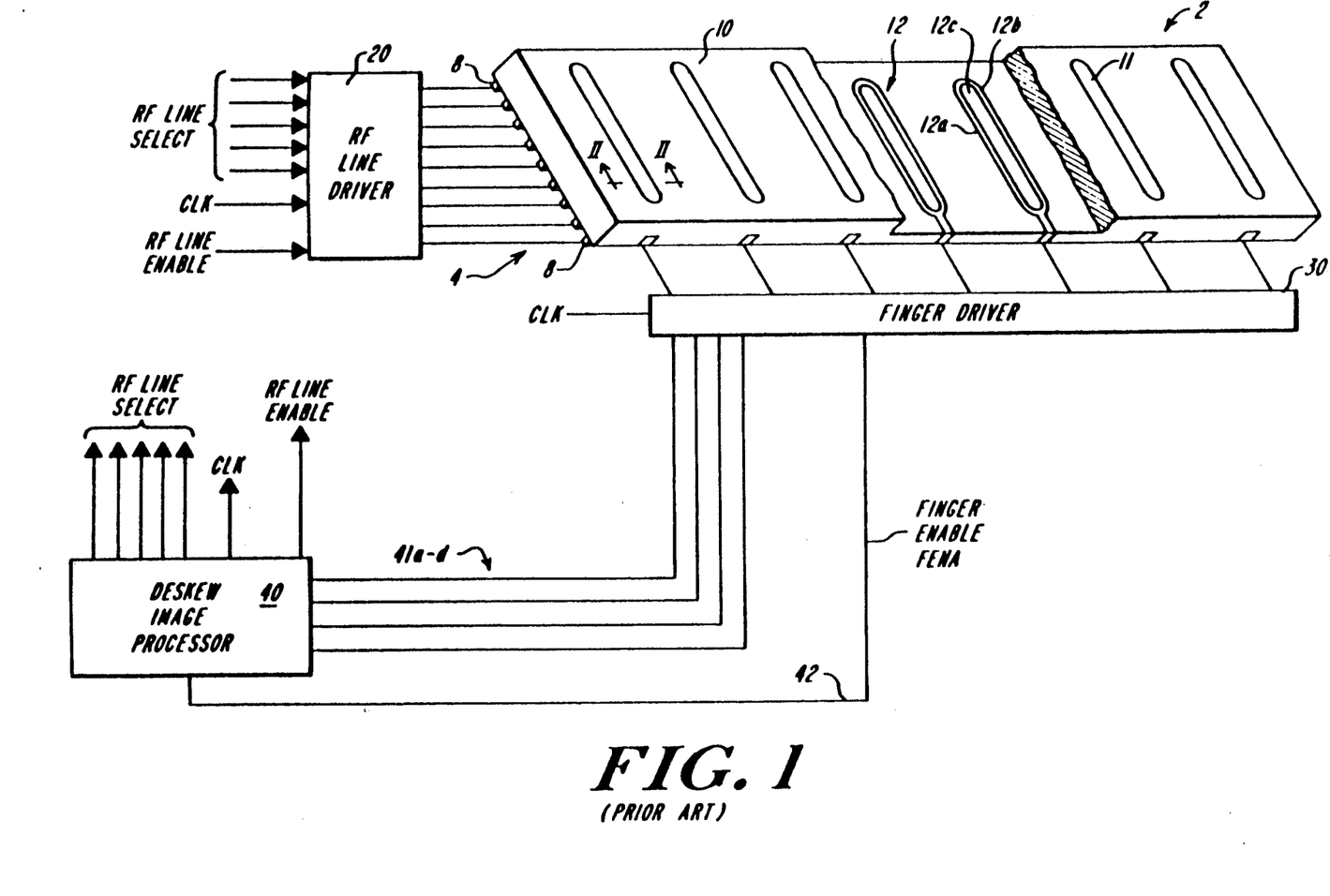
FIGS. 1-3 show a prior art print cartridge assembly and representative timing, bias and electrode actuation signals.

FIG. 1 shows by way of background a schematic representation of a prior art electrographic latent imaging unit 1 including a controllable print cartridge 2 having a first electrode set 4 consisting of a plurality of individual corona generating RF inducer electrodes 8 which extend along the length of the print cartridge.

A front electrode plane 10, or individual screen electrodes of a type known in the art, extends along the front surface of the print cartridge, which in an operative imaging system is located across a small gap from a dielectric imaging member such as a drum or belt (not shown). The front electrode plane 10 is maintained at a fixed potential equal to the nominal RF line center voltage. A plurality of individual finger electrodes 12 are located at an intermediate level of the print cartridge between the RF inducer electrode lines 8 and the screen electrode 10. Each finger electrode is driven between different potentials to selectively restrain charge carriers or allow them to escape out of a corona region at the crossing of the finger electrode and an actuated RF line passing transversely below it.

The illustrated finger electrodes 12 have parallel conductive arms or tines 12a, 12b each straddling a central slot 12c. An aperture which is shown as a slot opening 11 in the screen electrode 10 and in the intermediate insulating layer of the print cartridge is aligned over each slot 12c and extends down to the finger electrode 12. The fingers are oriented obliquely to the RF lines, so that the nominal dot spacing achieved in this manner is equal to the pitch of the finger electrode divided by the number of RF lines. In an alternative construction, a plurality of small holes 11a, 11b ... 11h ... (not illustrated) may replace the single slot, each hole being aligned over one crossing point of the RF electrodes 8, with each hole defining the position corresponding to one charge dot. For example, each finger electrode may control twenty holes 11i, one above each RF electrode 8.

With this electrode geometry, since dots with different horizontal offsets are generated by different RF electrodes, complex image encoding and timing control are necessary to activate the different electrodes in an appropriate order to print a straight line or a geometrically correct image. This control function is accomplished by a deskew board 40 which provides synchronizing, line selection and enable signals to effect the particular order and timing offset of the various electrode driving signals necessary to compensate for the oblique electrode geometry of the print cartridge, and to print geometrically correct images. The deskew board 40 controls an RF line driver 20 and a finger electrode driver 30.

The RF line driver 20 includes multiple high voltage RF signal or repetitive pulse generators, one connected to each line 8 to provide the corona generation burst to each of the RF lines. The finger driver circuit 30 includes an intermediate potential gate voltage power supply and corresponding multi-line power switching circuitry to switch the finger electrodes between back-biased and forward-biased states. This finger driver 30 provides timed bias voltage signals to each of the finger electrodes. A typical print cartridge may have 128 or 160 such finger electrodes. Each of the drivers 20, 30 receives corresponding electrode selection, timing and/or enable signals from the deskew board 40. The driver circuits also receive a system clock signal (typically 2.5 MHz) which is used to coordinate various internal circuit steps of switching, latching and shifting data or control signals.

In this prior art device, four parallel lines 41a–d each provide a high or low finger selection signal which is clocked into a corresponding 32-bit shift register. After 32 clock cycles, 128 finger selection signals are loaded into registers for selecting which of the 128 finger electrodes are to be actuated. A finger enable signal FENA synchronized with the RF burst then appears on line 42 and the drive circuit 30 switches the finger state of all the selected fingers.

Figure 2:
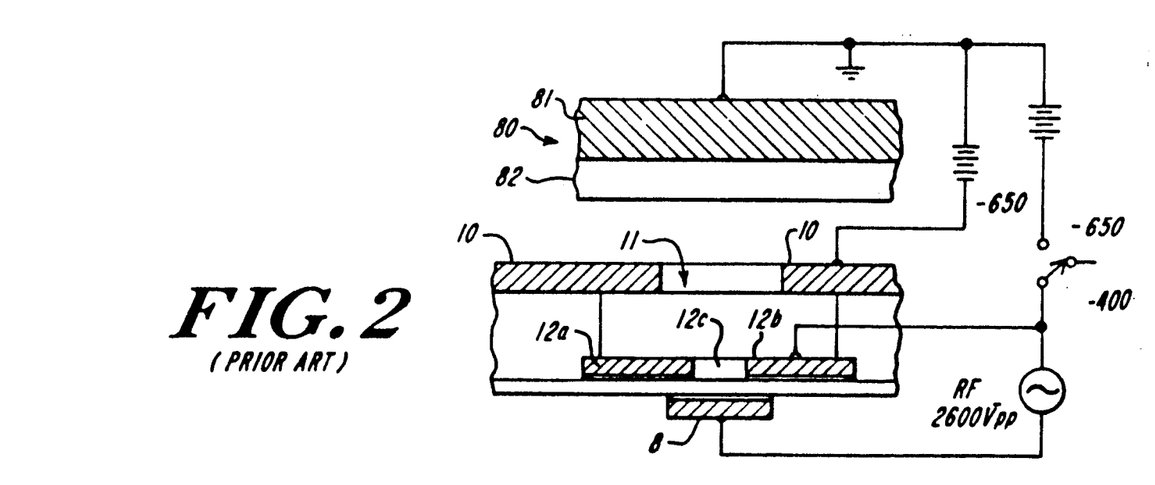

FIG. 2 is a sectional view taken along line II—II of FIG. 1, showing the structure of one electrode crossing or dot generator of the print cartridge array. The latent imaging member 80, which may be a moving belt or drum, is shown spaced across from the opening 11 to receive accelerated charge carriers, e.g., ions or electrons, from the print cartridge. Imaging member 80 comprises a dielectric surface layer 82 which receives the latent charge image, and a conductive inner layer 81 which is grounded and functions as a counter-electrode. For printing with negative ions or negative charge carriers, e.g., electrons, the screen electrode 10 is biased to approximately minus 650 volts with respect to conductive layer 81, and a 2600 volt peak to peak RF signal burst is periodically applied between RF line 8 and screen electrode 10. As the member 80 is moved, the finger electrode is switched between an OFF, or non-printing, state in which it is back biased to a potential approximately 250 volts positive of the screen, and a ON, or printing, state in which it is placed at a Potential approximately equal to that of the screen. In the latter state, negative charge carriers generated in region 12c at the bottom of opening 11 are accelerated from the opening and projected toward member 80.

Figure 3:
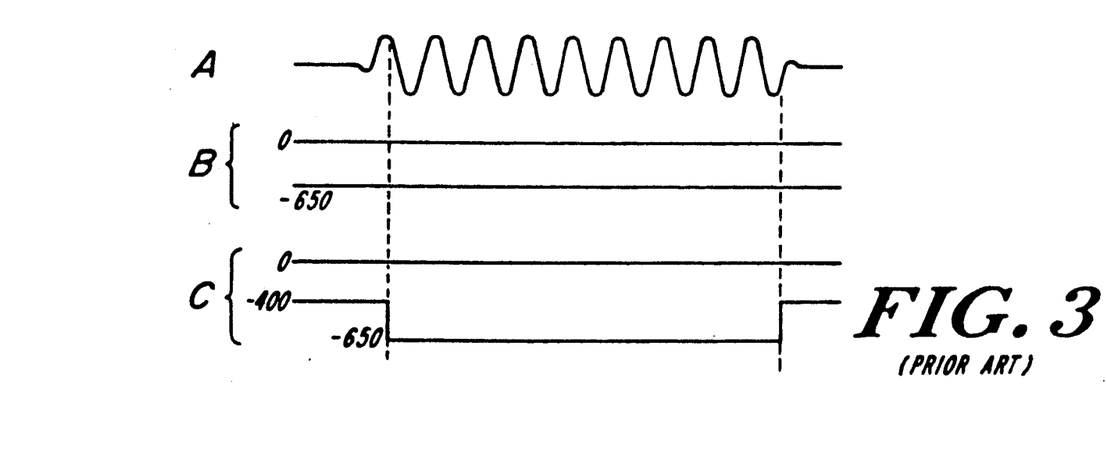

FIG. 3 illustrates the form and timing of electrode driving and control signals of the prior art print cartridge operated for printing a negative charge latent image. Line A shows the RF signal burst applied to the corona-inducing electrode 8. Line B shows the screen voltage. For the illustrated print cartridge with a single screen electrode 10 in the form of a front electrode plane, this signal is a constant minus 650 volt potential with respect to the grounded counter-electrode 81. Line C illustrates the signal applied to a finger electrode to pass negative charge carriers from the holes 11. This signal switches between the screen potential and a potential which is several hundred volts positive of the screen potential. As shown, the finger electrode signal, Line C, is constant for an interval substantially coextensive with the RF burst, Line A. However, as noted in the aforesaid U.S. Pat. No. 4,841,313, when operated to print half-tones or grey scale, the signal may have a shorter duration, coextensive with less than all of the RF cycles. Effectively, the screen voltage, Line B, serves to screen the print cartridge corona region from the large potential difference of the counter-electrode and prevent the extraction of charge from non-activated holes.

As described in more detail in the aforesaid U.S. Pat. No. 4,992,807, the fingers may also be driven to a varying potential, a PWM step potential, or other potential to vary the amount of delivered charge.

Figure 4:
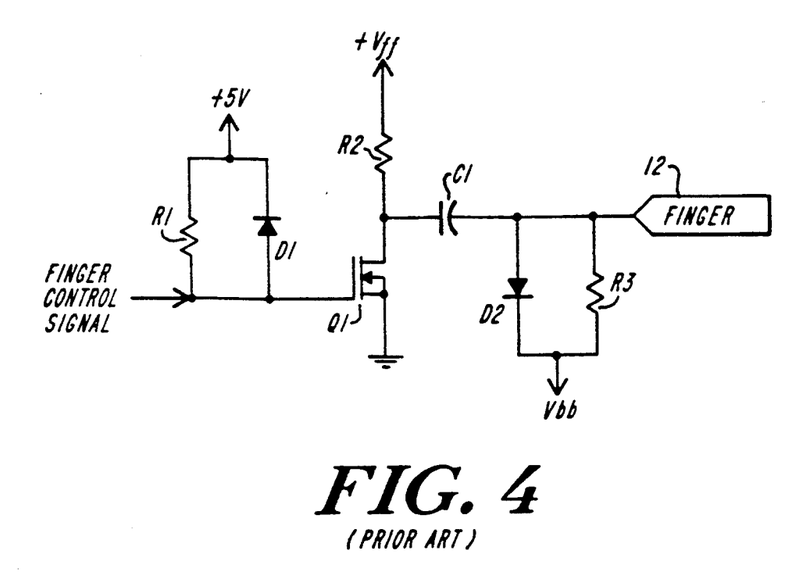
FIG. 4 shows a prior art finger driver circuit formed of discrete elements.

FIG. 4 illustrates a prior art driver circuit for controlling the potential applied to one finger to vary between a printing or ON state, and a non-printing or OFF state at potential Vbb, the so-called back-bias potential. In operation, a control input signal is supplied by an open-collector source and is clamped by diode D1 to five volts. When the input signal is high, transistor Q1 switches on to activate the finger 12. When the input is low, the output of the circuit is pulled up through resistor R2. Capacitor C1, diode D2, and resistor R3 shift the output level so that the potential of an inactive finger is the back-bias voltage, Vbb. The potential of an active finger is Vbb-Vff. The resistor R3 further limits fault current in the event of an arc or short circuit in the print cartridge.

In the drive circuit of FIG. 4, the rise time of the output signal is dominated by the time constant R2*C, where C denotes the composite capacitance of the cartridge, transistor Q1 and diode D2, and their connecting leads. If the value of R2 is reduced to improve the rise time, then power consumption rises to an unacceptably high level, while the cartridge capacitance is constrained by manufacturing processes to a substantial level and thus can not be significantly reduced.

Figure 5:
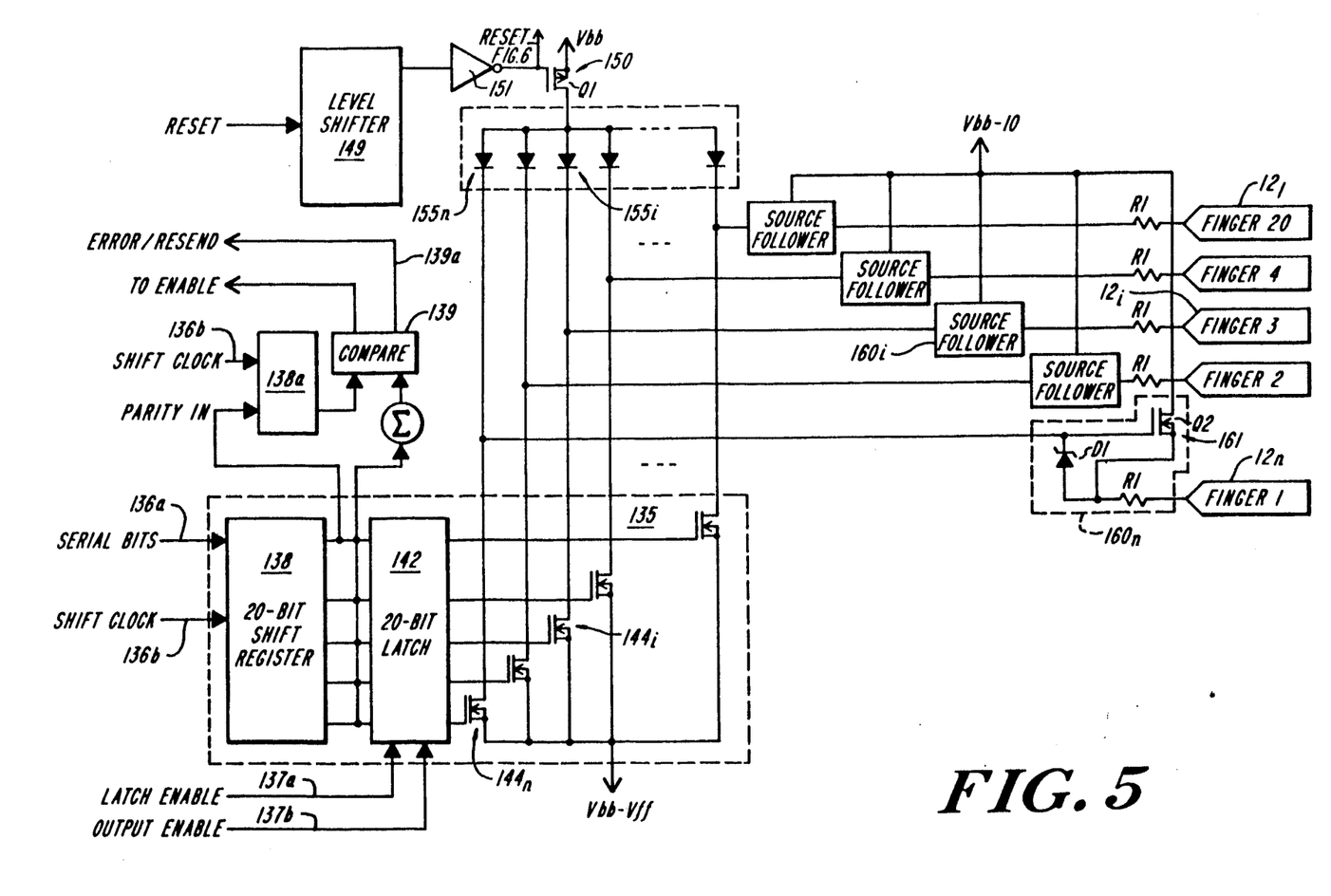
FIG. 5 shows an improved finger driver circuit in accordance with the present invention.

FIG. 5 shows a finger drive circuit 130 used in accordance with the present invention. In this circuit, each of a plurality of fingers, $12_i$ (i=1, . . . n) is connected to a corresponding one of the output switching transistors $144_i$ of an integrated circuit 135 having an input n-bit shift register 138, n-bit latch 142 and n output transistors $144_i$. The chip 135 receives a serial data stream on line 136a and a clock signal on line 136b to fill the shift register, and receives enable signals on lines 137a, 137b to latch the state data for all n fingers and to pass the latched control levels to transistors $144_i$ for driving the designated fingers. Chip 135 may, for example, drive twenty fingers, so that only six or eight chips are needed to control all fingers of a standard page-size print cartridge. Logic and switching circuitry of conventional type can be readily configured to Provide each chip with its separate data stream of finger control data, the clock and enable signals being identical for all chips. This architecture greatly relaxes the timing constraints on cartridge actuation.

As shown, the output transistors of chip 135 have open-drain outputs, and some external active device is required to reset the voltage level. In the illustrated embodiment of the present invention, a single P-channel MOSFET is connected to all fingers through respective diodes $155_i$ (i=1 . . . n) which serve to isolate each finger from all other fingers.

In the circuit of FIG. 5, the positive terminal of the finger driver power supply is connected to Vbb. This arrangement requires that input data be isolated from system ground, which is feasible since the number of input lines is small, and is accomplished by conventional input isolation circuitry, e.g., using optoelectronic isolators or the like.

The control signal for switching transistor 150 is applied through invertor 151 from level-shifting logic 149. The logic design is such that transistor 150 is ON during most of the interval in which no finger is driven low. In this manner, a single transistor pulls up all fingers at once, e.g., with reset occurring at regular intervals. Thereafter it relies on charge storage to keep the fingers high.

Applicant has found that with the significant charge coupling due to the capacitance between parallel fingers, crosstalk may degrade the level of charge on individual fingers. This is because the stored charge on the finger, which depends on the finger-to-ground capacitance, is of comparable magnitude to the capacitively-coupled charge between adjacent fingers, so that when one finger is turned ON, its neighbors each experience some flow of charge. Thus, fingers do not remain reliably reset (pulled up) when their neighbors are pulled down.

To overcome this situation, applicant provides additional charge storage by an output source follower $160_i$ in line with each finger output.

The output source follower $160_n$ for finger $12_n$ is illustrated in detail, and consists of a field effect transistor 161 with a Zener diode across the gate and source, in which the drain is connected to a supply voltage a few volts, e.g., ten volts less than the reset voltage Vbb. Substantial charge is stored in the gate region of the follower at reset. This charge, isolated from the finger by the follower, is sufficient to keep inactive fingers high.

In accordance with a further aspect of the invention, multiple error detectors are provided to assure that signal faults in the data input stream and hardware faults in the finger electrode are detected and identified.

Errors in the input shift register data are identified by providing a parity bit in each input data stream, and checking the sum of the input data bits against the parity bit as the data leaves the register 138 (FIG. 5). This is achieved by providing a second shift register 138a of the same length as the first shift register. The parity bit, the first bit of the data stream, is clocked through to arrive at the output of register 138a at the same time that the finger data leaves register 138. The parity bit is compared to the least bit position of the sum of the finger drive bits by comparator 139, which produces an error output on line 139a. The error output may be provided to the image processing circuitry as a message to re-send the data for that finger drive chip, or may be simply recorded to aid in later diagnostics for identifying the source of the faulty data transmission.

Figure 6:
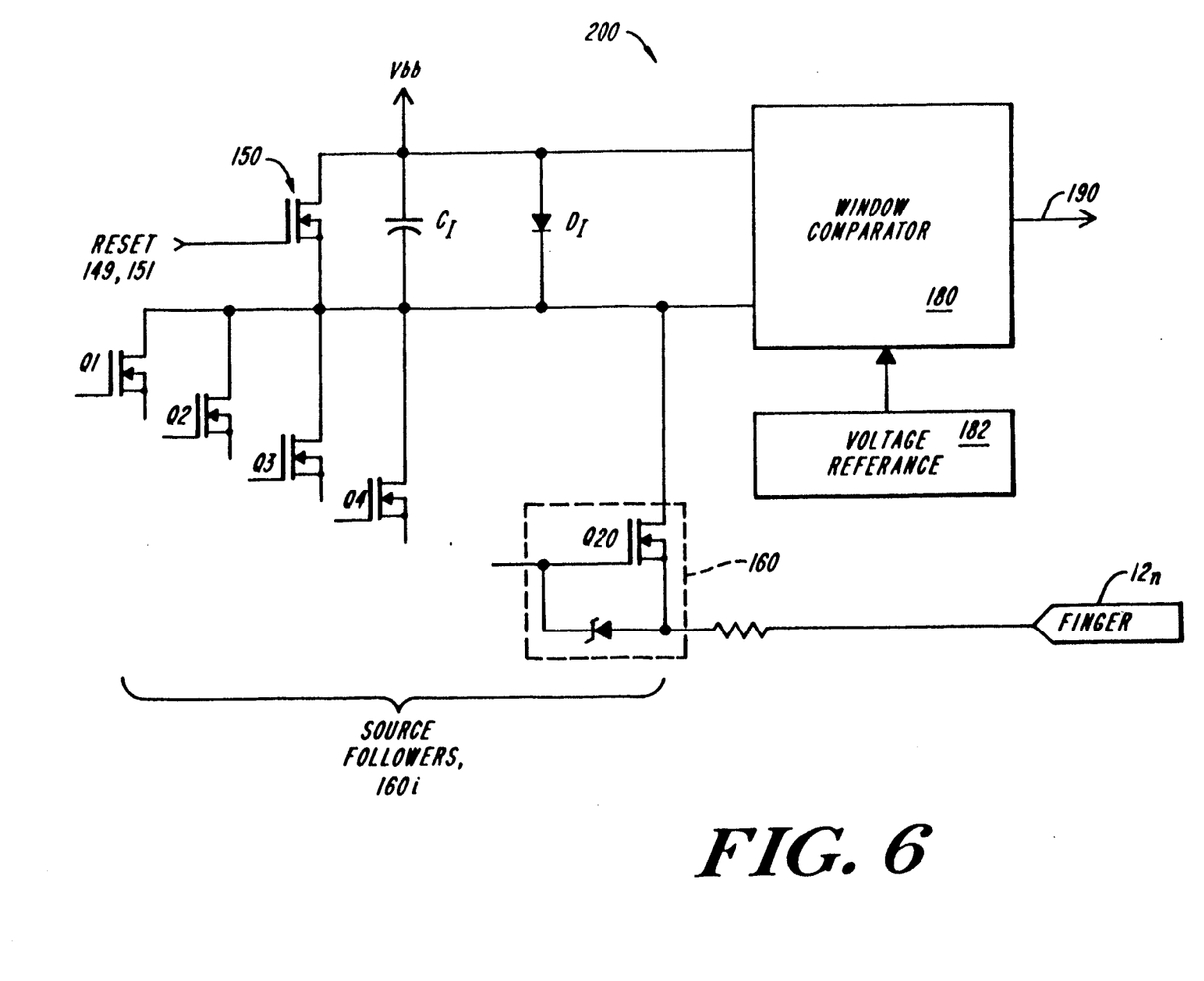
FIG. 6 shows a diagnostic circuit useful with the driver of FIG. 5.

Faults in the finger hardware are detected by a different circuit 200, shown in FIG. 6. A diode $D_f$ and capacitor $C_f$ are placed across the drain and source of a transistor 170 connected to the output source followers 160 (FIG. 5) to integrate the drain current of all the output followers 160i, thus obtaining a direct measure of the amount of charge transferred when the fingers are reset. Shortly after reset, the voltage across capacitor $C_f$ is such a direct measure of transferred charge.

In practice, this charge will depend on the number of fingers which were reset from an active ON state. The finger fault check is not performed during the printing of arbitrary images. Instead, a special test data sequence is run during printer idle time or between printing images, to actuate a single finger during each test, and to apply the Reset signal immediately thereafter. Then a window comparator 180 is enabled to receive the instantaneous voltage $V_{reset}$ across capacitor $C_f$ after reset. This voltage is then compared with a fixed reference voltage $V_{ref}$ provided on line 181 form a reference supply 182.

Window comparator 180 detects whether the measured voltage is substantially less than or significantly greater than $V_{ref}$. A low voltage indicates a possible open finger condition, and a high voltage indicates a possible short condition.

The single finger actuation test is performed in sequence under software control, with the window comparator operated after each reset to check the integrity of all twenty fingers driven by chip 135.

A set of diagnostic signals are output on line 190 for display, or sent to storage in printer diagnostic module. In this manner faulty finger electrodes and electrode connections are detected before the faults manifest themselves in visible print defects or costly equipment failure.

This completes a description of a printing system and print cartridge controller according to the present invention, which has been illustrated by reference to printers of known construction. It will be understood that the description of timing and control details of the illustrated embodiments is intended as illustrative of the principles and operation of the invention, but is not intended to limit its scope and application. The salient features of the invention being thus disclosed, variations and modifications thereof will occur to those skilled in the art for adapting the invention to diverse imaging systems, and all such variations and modifications are considered to be within the scope of the invention, as defined by the claims appended hereto.

What is claimed is:

1. In a printing device having an array of electrodes for gating charge carriers at an imaging member, the array including control electrodes that are impressed with at least first and second different potentials at different times to gate. charge carriers when the control electrodes are at said first potential and to block charge carriers when the control electrodes are at said second potential, and including driver means for impressing the control electrodes with said first and second potentials at selected times for forming an imagewise charge pattern on said imaging member, the improvement wherein said driver means comprises first means for selectively driving ones of said control electrodes at said first potential to gate charge carriers therefrom reset means for generating said second potential a plurality of diodes one diode interconnecting each control electrode to said reset means such that all control electrodes are impressed with the second potential when the reset means is active, and charge storage means connected to each control electrode for storing a stabilizing charge, the reset means being active during a period when no control electrode is driven by the first means, and the charge storage means storing sufficient charge that each control electrode remains at said second potential after reset until it is again driven by said first means.

2. The improvement of claim 1, wherein said first means includes one or more integrated circuits for receiving data input and switching a potential at a number of output lines determined by said data input.

3. The improvement of claim 2, wherein the charge storage means includes an output source follower.

4. The improvement of claim 3, further comprising means for diagnosing integrity of each control electrode.

5. The improvement of claim 4, wherein the means for diagnosing integrity includes means for determining an amount of charge passing to a control electrode.

6. The improvement of claim 5, wherein the means for determining compares the amount of charge to a reference.

7. The improvement of claim 4, further comprising means for checking accuracy of the data input.

8. The improvement of claim 5, further comprising means for checking accuracy of the data input.

9. A print cartridge assembly for effecting a write operation by depositing a pointwise charge distribution on a dielectric member, and comprising a print cartridge and a print cartridge controller, said print cartridge including for each pixel a set of electrode structures including a first electrode structure for forming a charge breakdown region from which charge carriers may be accelerated, a third electrode structure impressed with an extraction potential for accelerating charge carriers from the charge breakdown region, and a second electrode structure interposed between the first and third electrode structures for controlling the extraction of said charge carriers, said first electrode structure receiving an actuating signal during a write operation for the pixel, and said controller including first means for actively driving each said second electrode separately to an ON potential wherein charge carriers are gated from the charge breakdown region, a common bus in diode blocking communication with each of a plurality of second electrodes for restoring to an OFF potential all of the plurality of second electrodes when no second electrode is actively driven to an ON potential, and charge storage means connected to each second electrode for maintaining it substantially at the OFF potential until again driven ON by said first means.

10. A printing system comprising a dielectric member means for applying toner to charged regions of the dielectric member to form a toned image means for transferring the toned image to a recording member, and a print cartridge assembly for effecting a write operation by depositing a pointwise charge distribution on the dielectric member, such assembly comprising a print cartridge and a print cartridge controller, said print cartridge including for each pixel a set of electrode structures including a first electrode structure for forming a charge breakdown region from which charge carriers may be accelerated, a third electrode structure impressed with an extraction potential for accelerating charge carriers from the charge breakdown region, and a second electrode structure interposed between the first and third electrode structures for controlling the extraction of said charge carriers, said first electrode structure receiving an actuating signal during a write operation for the pixel, and said controller including first means for actively driving each said second electrode separately to an ON potential wherein charge carriers are gated from the charge breakdown region, a common bus in diode blocking communication with each of a plurality of second electrodes for restoring to an OFF potential all of the plurality of second electrodes when no second electrode is actively driven to an ON potential, and charge storage means connected to each second electrode for maintaining it substantially at the OFF potential until again driven ON by said first means.

11. A printing system according to claim 10, wherein the first means includes a display driver chip for driving plural second electrodes to an ON potential in accordance with serial control data.

12. A printing system according to claim 11, further comprising means for detecting errors in the serial control data.

13. A printing system according to claim 12, further comprising means for detecting a fault condition in each second electrode.

* * * * *